United States Patent
Roda

(10) Patent No.: US 11,193,424 B2
(45) Date of Patent: Dec. 7, 2021

(54) ASSEMBLY FOR A TURBOMACHINE

(71) Applicant: Safran Aircraft Engines, Paris (FR)

(72) Inventor: Jean Charles Olivier Roda, Reau (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 53 days.

(21) Appl. No.: 16/748,079

(22) Filed: Jan. 21, 2020

(65) Prior Publication Data
US 2020/0277899 A1   Sep. 3, 2020

(30) Foreign Application Priority Data

Jan. 22, 2019 (FR) ..................... 1900514

(51) Int. Cl.
| | | |
|---|---|---|
| *F02C 7/232* | (2006.01) | |
| *F02C 9/26* | (2006.01) | |
| *F02C 9/48* | (2006.01) | |
| *F16K 31/06* | (2006.01) | |

(52) U.S. Cl.
CPC .............. *F02C 7/232* (2013.01); *F02C 9/26* (2013.01); *F02C 9/48* (2013.01); *F16K 31/0603* (2013.01)

(58) Field of Classification Search
CPC ...... F02C 3/14; F02C 5/02; F02C 5/06; F02C 5/12; F02C 6/003; F02C 7/232; F16K 31/0603; F23R 3/34; F23R 3/42; F23R 7/00; F23R 2900/03341
See application file for complete search history.

(56) References Cited

U.S. PATENT DOCUMENTS

| | | | | | |
|---|---|---|---|---|---|
| 2,791,884 | A | * | 5/1957 | Holzwarth | ................ F23R 7/00 60/792 |
| 5,557,919 | A | * | 9/1996 | Althaus | ..................... F02C 3/02 60/39.45 |
| 2004/0250529 | A1 | * | 12/2004 | Macarez | ................... F02C 5/12 60/225 |

FOREIGN PATENT DOCUMENTS

| | | |
|---|---|---|
| FR | 2 829 528 A1 | 3/2003 |
| GB | 374648 A | 6/1932 |
| WO | 2016/198792 A1 | 12/2016 |

OTHER PUBLICATIONS

Richards Ph.D., "New Developments in Combustion Technology Part II: Step change in efficiency", National Energy Technology Laboratory, U.S. Department of Energy, 2014, pp. 1-47.
Search Report dated Oct. 22, 2019 by the French Patent Office in application No. 1900514.
Search Report dated Mar. 5, 2020 by the European Patent Office in application No. 20 30 5049.

* cited by examiner

*Primary Examiner* — Scott J Walthour
(74) *Attorney, Agent, or Firm* — Sughrue Mion, PLLC

(57) ABSTRACT

The present invention relates to an assembly for a turbomachine (1) comprising:
a compressor (30),
an isochoric combustion chamber (7),
an isobaric combustion chamber (40), and
a turbine (50).

15 Claims, 3 Drawing Sheets

ASSEMBLY FOR A TURBOMACHINE

FIELD OF THE INVENTION

The present invention relates to an assembly for a turbomachine.

The invention concerns more specifically an assembly for a turbomachine comprising an isochoric combustion chamber.

STATE OF THE ART

With reference to FIG. 1, a known turbomachine 1 comprises, from upstream to downstream relative to the direction of air flow within said turbomachine 1 in operation, a fan 10, a low-pressure compressor 20, a high-pressure compressor 30, an isobaric combustion chamber 40, a high-pressure turbine 50 and a low-pressure turbine 60. The high-pressure compressor 30 and the high-pressure turbine 50 form a high-pressure body 2, and the low-pressure compressor 20 and the low-pressure turbine 60 form a low-pressure body 3.

In operation, the air taken by the fan 10 is distributed between a primary stream 4, flowing through the high-pressure body 2 and the low-pressure body 3, and a secondary stream 5, flowing around the high-pressure body 2 and the low-pressure body 3. The primary stream 4 is compressed through the compressors 20, 30, then undergoes a combustion within the isobaric combustion chamber 40, to be finally expanded in the turbines 50, 60. The turbines 50, 60 drive in rotation both the fan 10 and the compressors 20, 30.

Most of the recent improvements of such a turbomachine 1 have focused on the optimization of the thermodynamic cycle thereof. By lowering the pressure ratio of the fan 10 and, as a corollary, by increasing the bypass ratio (i.e. the ratio between the mass of the secondary stream 5 and the air mass of the primary stream 4) and/or the compression ratio (i.e. the ratio between the total pressure upstream and downstream of the fan 10 and of the compressors 20, 30), increases in propulsive efficiency and/or thermal efficiency have been observed.

However, such improvements are partly degraded by increases in mass and aerodynamic drag.

There is therefore a need to improve existing turbomachines, in particular with a view to reducing their consumption.

DISCLOSURE OF THE INVENTION

One of the aims of the invention is to improve the specific fuel consumption of a turbomachine.

Another aim of the invention is to reduce the mass of the components of a turbomachine.

To this end, according to a first aspect of the invention, an assembly for a turbomachine is proposed, comprising:
a compressor,
an isochoric combustion chamber, said isochoric combustion chamber comprising:
an intake valve, said intake valve being movable between:
an open position, in which the intake valve authorizes the intake of a fluid coming from the compressor towards the isochoric combustion chamber, and
a closed position, in which the intake valve prevents the intake of a fluid coming from the compressor towards the isochoric combustion chamber, and a discharge valve, said discharge valve being movable between:
an open position, in which the discharge valve authorizes the discharge of a fluid coming from the isochoric combustion chamber, and
a closed position, in which the discharge valve prevents the discharge of a fluid coming from the isochoric combustion chamber,
an isobaric combustion chamber configured to receive a fluid discharged from the isochoric combustion chamber, and
a turbine configured to receive a fluid coming from the isobaric combustion chamber.

Thanks to the isochoric combustion chamber, the temperature of the fluid received by the isobaric combustion chamber is increased. In this way, the efficiency of the constant-pressure combustion within the isobaric combustion chamber is improved, thereby reducing the specific fuel consumption of the turbomachine. In addition, the isochoric combustion chamber is the seat of constant-volume combustion, the thermal efficiency of which is higher than the thermal efficiency of a constant-pressure combustion.

Advantageously, but optionally, the assembly according to the invention may comprise any one of the following characteristics, taken alone or in any combination:
it comprises an intake control system configured to control a passage between the open position and the closed position of the intake valve, the intake control system comprising a first electromagnet and a first return spring,
the first return spring is configured to bias the intake valve towards the open position,
the first electromagnet is configured to bias the intake valve towards the closed position when the first electromagnet is supplied with electrical energy,
it comprises a discharge control system configured to control a passage between the open position and the closed position of the discharge valve, the discharge control system comprising a second electromagnet and a second return spring,
the second return spring is configured to bias the discharge valve towards the open position,
the second electromagnet is configured to bias the discharge valve towards the closed position when the second electromagnet is supplied with electrical energy,
it comprises an injector configured to inject fuel inside the isochoric combustion chamber,
the injector is disposed closer to the intake valve than to the discharge valve, and
the isochoric combustion chamber extends along a longitudinal axis of the turbomachine, the injector having an axis extending along a direction radial to the longitudinal axis.

According to a second aspect of the invention, a method for operating an assembly as previously described is proposed, comprising the following steps:
intake of a fluid inside the isochoric combustion chamber,
injection of fuel inside the isochoric combustion chamber,
combustion of the mixture formed by the taken fluid and the injected fuel,
discharge of the fluid derived from the combustion of the mixture out of the isochoric combustion chamber, and
scavenging of the isochoric combustion chamber.

Advantageously, but optionally, the method according to the invention can comprise any one of the following characteristics, taken alone or in any combination:
during the injection and combustion steps, the intake valve and the discharge valve are in the closed position, and during the scavenging step, the intake valve and the discharge valve are in the open position.

According to a third aspect of the invention, a turbomachine comprising an assembly as previously described is provided.

DESCRIPTION OF THE FIGURES

Other characteristics, aims and advantages of the invention will emerge from the following description, which is purely illustrative and non-limiting, and which should be read in relation to the appended drawings in which.

DETAILED DESCRIPTION OF THE INVENTION

With reference to the figures, an assembly for a turbomachine and a method for operating an assembly for a turbomachine will now be described.

Turbomachine 1

Figure 1:
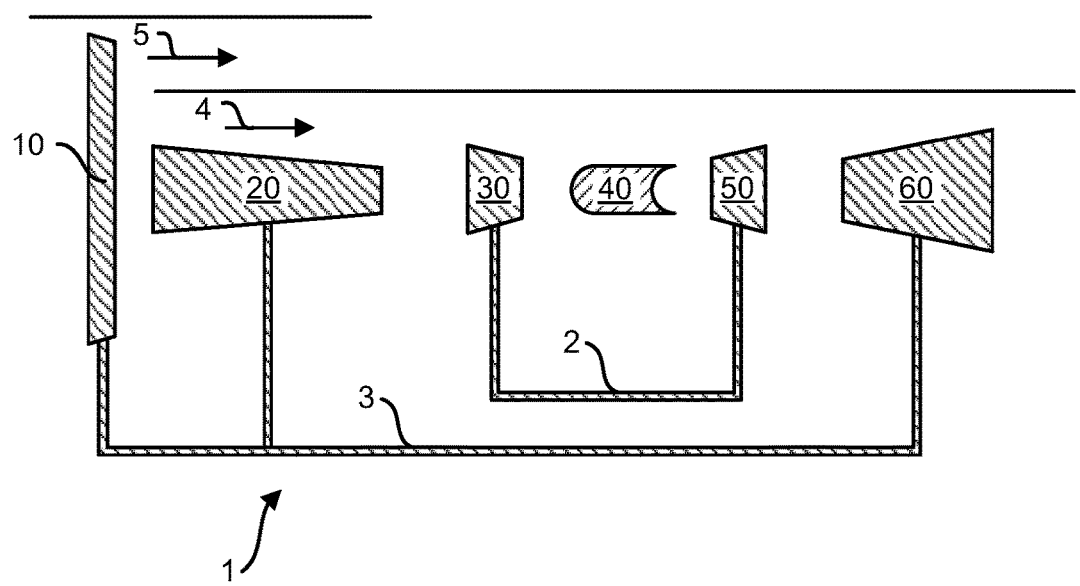
FIG. 1, already described, schematically illustrates a turbomachine known in the state of the art, FIG. 2 schematically illustrates one example of embodiment of an assembly for a turbomachine according to the invention, FIG. 3 schematically illustrates one example of embodiment of an isochoric combustion chamber for one embodiment of an assembly for a turbomachine according to the invention, and FIG. 4 schematically illustrates different steps of one example of implementation of an operating method according to the invention.
Figure 2:
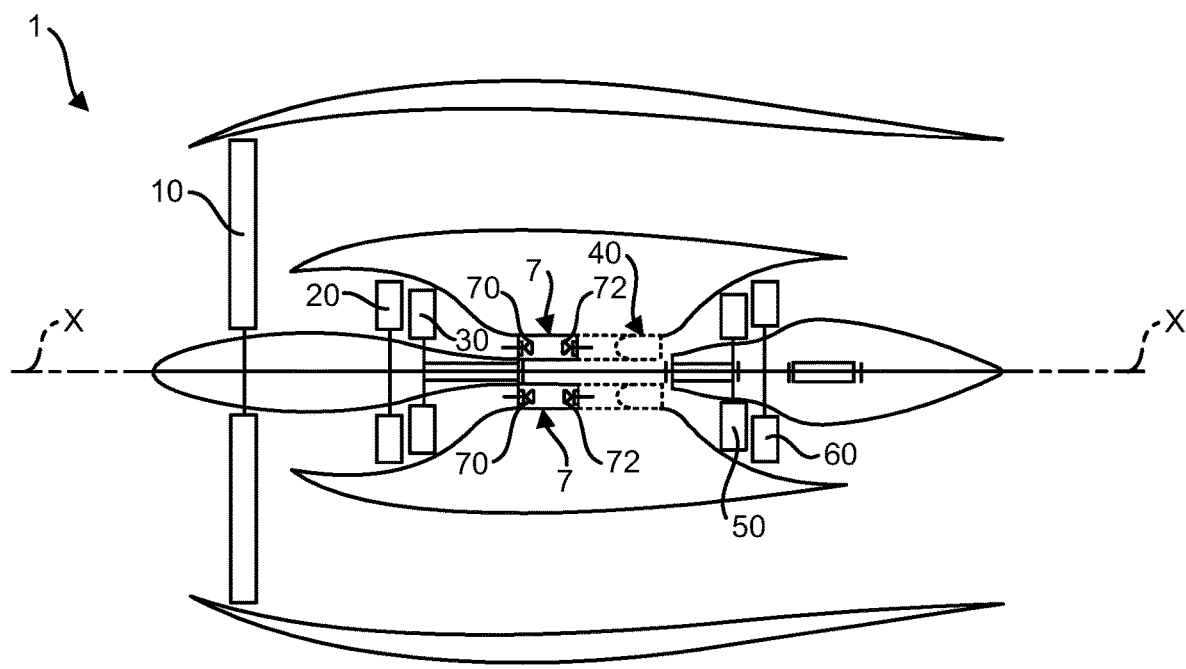

Referring to FIG. 2, a turbomachine 1 comprises a compressor 30 extending along a longitudinal axis X-X of the turbomachine 1. The turbomachine 1 further comprises a turbine 50 also extending along the longitudinal axis X-X, the turbine 50 being driven in rotation about the longitudinal axis X-X by the compressor 30. In addition, an isobaric combustion chamber 40 is arranged axially between the compressor 30 and the turbine 50. The isobaric combustion chamber 40 is configured to be the seat of an isobaric combustion, that is to say, constant-pressure combustion. Finally, an isochoric combustion chamber 7 is arranged axially between the compressor 30 and the isobaric combustion chamber 40. The isochoric combustion chamber 7 is configured to be the seat of isochoric combustion, that is to say, constant volume combustion.

Generally, the isochoric combustion chamber 7 is configured to receive a fluid coming from the compressor 30, the isobaric combustion chamber 40 is configured to receive a fluid discharged from the isochoric combustion chamber 7, and the turbine 50 is configured to receive a fluid coming from the isobaric combustion chamber 40.

In the present application, the upstream and the downstream are defined with respect to the normal flow direction of a fluid through the turbomachine 1 in operation. Furthermore, an axial direction refers to a direction parallel to the longitudinal axis X-X, and a radial direction is a direction perpendicular to this longitudinal axis X-X, and passing through this longitudinal axis X-X. Unless specified otherwise, "inner" (or internal) and "outer" (or external), respectively, are used with reference to a radial direction so that the inner (i.e. radially inner) portion or face of an element is closer to the longitudinal axis X-X than the outer (i.e. radially outer) portion or face of the same element.

As also seen in FIG. 2, the turbomachine 1 can comprise a fan 10 and a fan turbine 60 each extending along the longitudinal axis X-X, the fan 10 being driven in rotation about the longitudinal axis X-X by the fan turbine 60. Advantageously, the fan turbine 60 is disposed downstream of the turbine 50. Also advantageously, the turbomachine 1 may further comprise an additional compressor 20, also extending along the longitudinal axis X-X, and disposed downstream of the fan 10 and upstream of the compressor 30. This additional compressor 20 is also driven in rotation about the longitudinal axis X-X by the fan turbine 60. In one embodiment, the additional compressor 20 is a low-compressor pressure, the compressor 30 is a high-pressure compressor, the turbine 50 is a high-pressure turbine, and the fan turbine 60 is a low pressure turbine.

In operation, the fluid taken by the fan 10, typically air, is compressed through the compressors 20, 30, then undergoes constant-volume combustion within the isochoric chamber 7 before undergoing a constant-pressure combustion within the isobaric combustion chamber 40, to be finally expanded in the turbines 50, 60. The turbines 50, 60 drive in rotation both the fan 10 and the compressors 20, 30.

Isochoric Combustion Chamber 7

Figure 3:
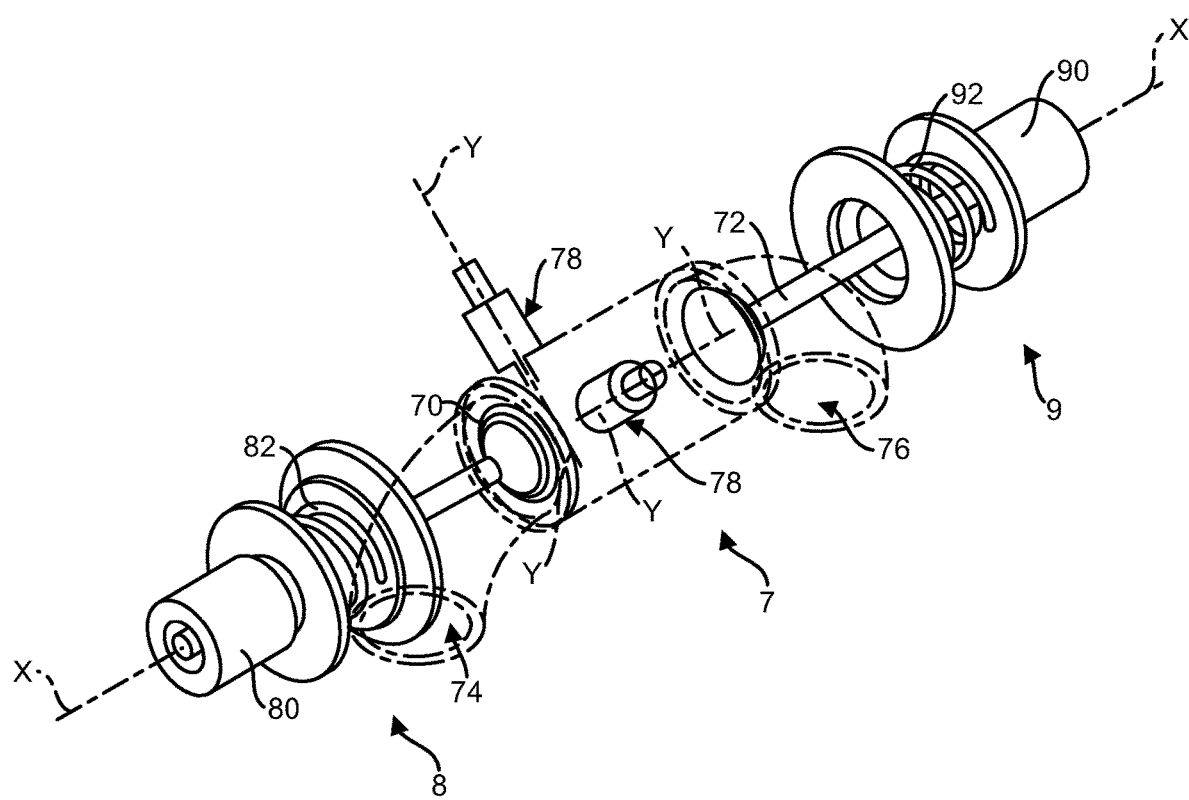
Figure 4:
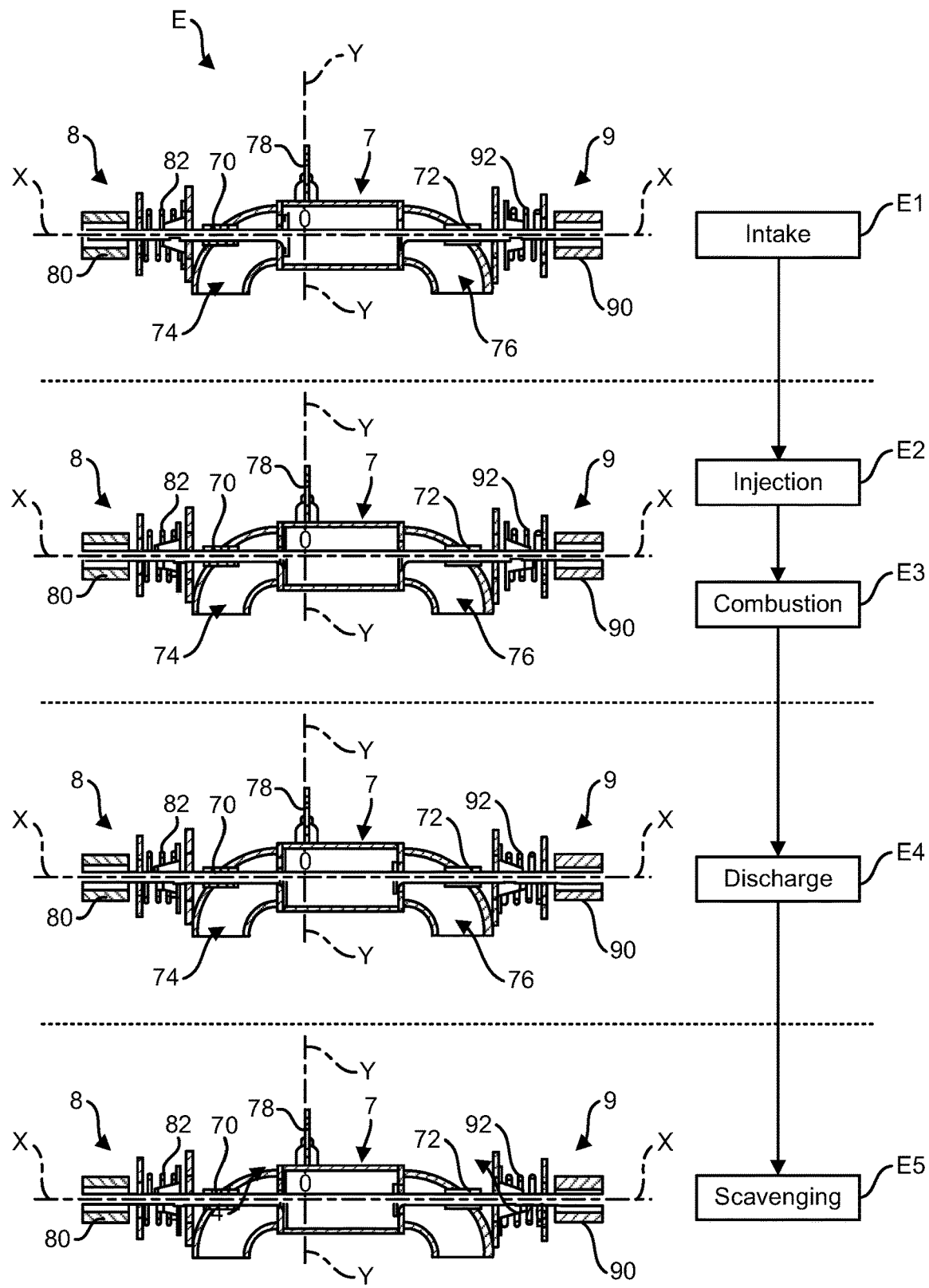

With reference to FIGS. 2 to 4, the isochoric combustion chamber 7 comprises:

an intake valve 70, said intake valve 70 being movable between:

an open position, in which the intake valve 70 authorizes the intake of a fluid coming from the compressor 30 towards the isochoric combustion chamber 7, and a closed position, in which the intake valve 70 prevents the intake of a fluid coming from the compressor 30 towards the isochoric combustion chamber 7, and a discharge valve 72, said discharge valve 72 being movable between:

an open position, in which the discharge valve 72 authorizes the discharge of a fluid coming from the isochoric combustion chamber 7, and a closed position, in which the discharge valve 72 prevents the discharge of a fluid coming from the isochoric combustion chamber 7.

As can be seen more precisely in FIGS. 3 and 4, the isochoric combustion chamber 7 advantageously comprises:

an intake duct 74, configured to guide a fluid intended to be taken within the isochoric combustion chamber 7, for example coming from the compressor, and a discharge conduit 76, configured to guide a fluid discharged from the isochoric combustion chamber 7, for example towards the isobaric combustion chamber 40.

With reference to FIGS. 3 and 4, in one embodiment, the turbomachine 1 comprises an intake control system 8 configured to control a passage between the open position and the closed position of the intake valve 70.

In one advantageous variant, the intake control system 8 comprises a first electromagnet 80, and a first return spring 82. In a preferred manner, the first return spring 82 is configured to bias the intake valve 70 towards the open position. In addition, the first electromagnet 80 is configured to bias the intake valve 70 towards the closed position when the first electromagnet 80 is supplied with electrical energy. In this way, in case of failure of the first electromagnet 80, the intake valve 70 remains in the open position.

Still with reference to FIGS. 3 and 4, in one embodiment, the turbomachine 1 comprises a discharge control system 9 configured to control a passage between the open position and the closed position of the discharge valve 72.

In one advantageous variant, the discharge control system 9 comprises a second electromagnet 90, and a second return spring 92. In a preferred manner, the second return spring 92 is configured to bias the discharge valve 72 towards the open position. In addition, the second electromagnet 90 is configured to bias the discharge valve 72 towards the closed position when the second electromagnet 90 is supplied with electrical energy. In this way, in case of failure of the second electromagnet 90, the discharge valve 72 remains in the open position.

In one embodiment, also illustrated in FIGS. 3 and 4, the turbomachine 1 comprises an injector 78 configured to inject fuel inside the isochoric combustion chamber 7. The injected fuel is mixed with the fluid taken within the isochoric combustion chamber 7 for the constant-volume combustion, typically by self-ignition of the fluid-fuel mixture. As seen in FIGS. 3 and 4, in one advantageous variant, the injector 78 is disposed closer to the intake valve 70 than to the discharge valve 72. In other words, the distance separating the intake valve 70 from the injector 78 is shorter than the distance separating the injector 78 from the discharge valve 72. In this way, the mixture of fuel with fluid taken within the isochoric chamber 7 is promoted, which allows optimizing the constant-volume combustion.

As seen in FIGS. 2 to 4, in one embodiment, the isochoric combustion chamber 7 extends along the longitudinal axis X-X. Advantageously, the injector 78 then has an axis Y-Y extending along a direction radial to the longitudinal axis X-X. This makes it possible to optimize the disposition of the isochoric combustion chamber 7 within the turbomachine 1.

In one embodiment seen in FIG. 2, the turbomachine 1 comprises a plurality of isochoric combustion chambers 7 distributed circumferentially about the longitudinal axis X-X. In this way, it is possible to monitor the increase in temperature of the fluid received by the isobaric combustion chamber 40, but also to optimize the management of the fluid flow rate coming from the compressor 30, which is then received by the isobaric combustion 40. Thus, it is possible to dispense with the presence of a plenum chamber upstream of the isobaric combustion chamber 40.

Operating Method E

With reference to FIG. 4, an operating method E of an assembly for a turbomachine 1 according to any one of the previously described embodiments, comprises the following steps:

intake E1 of a fluid inside the isochoric combustion chamber 7, injection E2 of fuel inside the isochoric combustion chamber 7, combustion E3 of the mixture formed by the taken fluid and the injected fuel, discharge E4 of the fluid derived from the combustion of the mixture out the isochoric combustion chamber 7, and scavenging E5 of the isochoric combustion chamber 7.

As seen in FIG. 4, in one embodiment, during the injection E2 and combustion E3 steps, the intake valve 70 and the discharge valve 72 are in the closed position.

Still with reference to FIG. 4, in one embodiment, during the scavenging step E5, the intake valve 70 and the discharge valve 72 are in the open position.

Thus, the combustion E3 occurs at constant volume, which causes an increase in pressure and temperature of the mixture. During the discharge E4, the mixture is at high temperature and high pressure when it is received by the isobaric combustion chamber 40. The pressure and the temperature then gradually decrease within the isochoric combustion chamber 7. Then, once the pressure inside the isochoric combustion chamber 7 is lowered below the level of the fluid pressure downstream of the compressor 30, the passage of the intake valve 70 in the open position makes it possible to replace the combusted mixture with fresh fluid within the isochoric combustion chamber 7.

In one embodiment where the turbomachine 1 comprises a plurality of isochoric combustion chambers 7, each isochoric combustion chamber 7 can operate out of phase with respect to the other isochoric combustion chambers 7. More specifically, each isochoric combustion chamber 7 implements an operating step E1, E2, E3, E4, E5 which is different from the operating steps E1, E2, E3, E4, E5 implemented by the other isochoric combustion chambers 7.

In one embodiment, it is necessary to ensure that the mixture discharged from the isochoric combustion chamber 7 comprises an excess fluid relative to the combusted gases in order to ensure that combustion can be carried out in the isobaric combustion chamber 40.

To do so, in a first variant, the amount of fuel injected during the injection E2 is less than the stoichiometric amount of fuel necessary for the combustion of all the fluid taken within the isochoric combustion chamber 7. In this first variant, the injected amount of fuel is nevertheless sufficient so that, under the conditions of temperature and pressure within the isochoric combustion chamber 7, the mixture can self-ignite, without needing to use a spark plug. In this case, it is also possible to limit the time for carrying out the scavenging step E5 in order to ensure that part of the combusted gases of the mixture remains trapped in the isochoric combustion chamber 7 in order to facilitate the self-ignition if necessary.

In one second variant to ensure the excess fluid, the scavenging step E5 is extended sufficiently so that an excess fluid can reach the isobaric combustion chamber 40.

In one embodiment, the intake duct 74 and the discharge duct 76 act, with the isobaric combustion chamber 40, as buffer volume for the operation of the isochoric combustion chamber 7.

In any event, no mechanical power is recovered by the turbomachine 1 following the constant-volume combustion within the isochoric combustion chamber 7.

The invention claimed is:

1. An assembly for a turbomachine, the assembly comprising:
    a low-pressure compressor,
    a high-pressure compressor configured to receive a first compressed fluid coming from the low-pressure compressor and produce a second compressed fluid,
    an isochoric combustion chamber, said isochoric combustion chamber comprising:
        an intake valve, said intake valve being movable between:
            an open position, in which the intake valve authorizes the intake of the second compressed fluid coming from the high-pressure compressor towards the isochoric combustion chamber, and
            a closed position, in which the intake valve prevents the intake of the second compressed fluid coming from the high-pressure compressor towards the isochoric combustion chamber, and
        a discharge valve, said discharge valve being movable between:
            an open position, in which the discharge valve authorizes the discharge of a first combustion fluid from the isochoric combustion chamber, and
            a closed position, in which the discharge valve prevents the discharge of fluid from the isochoric combustion chamber,
    the assembly further comprising:

an isobaric combustion chamber configured to receive the first combustion fluid coming from the isochoric combustion chamber, a high-pressure turbine configured to receive a second combustion fluid coming from the isobaric combustion chamber, wherein the high-pressure turbine is configured to drive in rotation the high-pressure compressor, and a low-pressure turbine configured to receive a first expanded fluid coming from the high-pressure turbine, wherein the low-pressure turbine is configured to drive in rotation the low-pressure compressor, wherein the assembly is configured to direct all the first combustion fluid from the isochoric combustion chamber to the isobaric combustion chamber without recovering mechanical power from any portion of the first combustion fluid.

2. The assembly according to claim 1, comprising an intake control system configured to control positioning of the intake valve between the open position and the closed position, the intake control system comprising a first electromagnet and a first return spring.

3. The assembly according to claim 2, wherein the first return spring is configured to bias the intake valve towards the open position.

4. The assembly according to claim 2, wherein the first electromagnet is configured to bias the intake valve towards the closed position when the first electromagnet is supplied with electrical energy.

5. The assembly according to claim 1, comprising a discharge control system configured to control positioning of the discharge valve between the open position and the closed position, the discharge control system comprising a second electromagnet and a second return spring.

6. The assembly according to claim 5, wherein the second return spring is configured to bias the discharge valve towards the open position.

7. The assembly according to claim 5, wherein the second electromagnet is configured to bias the discharge valve towards the closed position when the second electromagnet is supplied with electrical energy.

8. The assembly according to claim 1, comprising an injector configured to inject fuel inside the isochoric combustion chamber.

9. The assembly according to claim 8, wherein the injector is disposed closer to the intake valve than to the discharge valve.

10. The assembly according to claim 8, wherein the isochoric combustion chamber extends along a longitudinal axis, the injector having an axis extending along a direction perpendicular to the longitudinal axis.

11. A method for operating the assembly of claim 1, the method comprising the following steps:

admitting the second compressed fluid from the high-pressure compressor inside the isochoric combustion chamber;

injecting a fuel inside the isochoric combustion chamber;

combusting a mixture formed by the second compressed fluid from the high-pressure compressor and the fuel;

discharging the first combustion fluid from the isochoric combustion chamber, the first combustion fluid from the isochoric combustion chamber being derived from the combustion of the mixture; and scavenging of the isochoric combustion chamber.

12. The method according to claim 11, wherein, during the injecting and combusting steps, the intake valve and the discharge valve are in the closed position.

13. The method according to claim 11, wherein, during the scavenging step, the intake valve and the discharge valve are in the open position.

14. A turbomachine comprising the assembly of claim 1 and a fan located upstream of the low-pressure compressor, wherein the low-pressure turbine is configured to drive in rotation the fan.

15. The turbomachine according to claim 14, wherein the assembly comprises an injector configured to inject fuel inside the isochoric combustion chamber, wherein the isochoric combustion chamber extends along a longitudinal axis of the turbomachine, the injector having an axis extending along a direction perpendicular to the longitudinal axis.

* * * * *